United States Patent [19]

Miller

[11] Patent Number: 5,060,987
[45] Date of Patent: Oct. 29, 1991

[54] TORSION ISOLATION FITTING

[75] Inventor: Robert Miller, Arcadia, Calif.

[73] Assignee: Vemco Corporation, San Dimas, Calif.

[21] Appl. No.: 493,423

[22] Filed: Mar. 14, 1990

[51] Int. Cl.⁵ .............................................. F16L 25/00
[52] U.S. Cl. .................................. 285/328; 285/354; 285/917
[58] Field of Search ......................... 285/328, 917, 354

[56] References Cited

U.S. PATENT DOCUMENTS

| | | |
|---|---|---|
| 189,941 | 4/1877 | Kilbourne . |
| 268,686 | 12/1882 | Kaiser . |
| 406,397 | 7/1889 | Hampton . |
| 748,546 | 12/1903 | Vail . |
| 1,019,000 | 2/1912 | Watson . |
| 1,138,946 | 5/1915 | Elliott . |
| 1,337,427 | 4/1920 | Beach . |
| 1,440,207 | 12/1922 | Burns . |
| 1,504,363 | 8/1924 | Madigan . |
| 1,512,298 | 10/1924 | Mueller . |
| 1,930,833 | 10/1933 | Barrett . |
| 2,016,262 | 10/1935 | Arey et al. . |
| 2,109,344 | 2/1938 | Selger . |
| 2,195,492 | 4/1940 | McDonald . |
| 2,805,872 | 9/1957 | Routh . |
| 3,109,671 | 11/1963 | Braun . |
| 3,174,774 | 3/1965 | Oetiker .................... 285/328 |
| 3,208,758 | 9/1965 | Carlson et al. . |
| 3,357,725 | 12/1967 | Champion . |
| 3,521,910 | 7/1970 | Callahan, Jr. et al. . |
| 3,679,237 | 7/1972 | De Angelis . |
| 3,840,257 | 10/1974 | Moore . |
| 4,022,499 | 5/1977 | Holmes et al. .................... 285/328 |
| 4,303,251 | 12/1981 | Harra et al. . |
| 4,436,326 | 3/1984 | Peaster . |
| 4,552,389 | 11/1985 | Babuder et al. . |
| 4,561,682 | 12/1985 | Tisserat . |
| 4,600,218 | 7/1986 | Ross et al. . |
| 4,650,227 | 3/1987 | Babuder et al... |
| 4,660,868 | 4/1987 | Totani . |
| 4,665,960 | 5/1987 | Brzezicki et al. . |
| 4,685,707 | 8/1987 | Miyashita . |
| 4,691,944 | 9/1987 | Viall, Jr. . |
| 4,811,975 | 3/1989 | Paul, Jr. et al. . |
| 4,811,976 | 3/1989 | Yagisawa . |
| 4,852,917 | 8/1989 | Viall, Jr. . |
| 4,854,597 | 8/1989 | Leigh . |

FOREIGN PATENT DOCUMENTS

| | | |
|---|---|---|
| 581937 | 8/1959 | Canada . |
| 3105395 | 4/1982 | Fed. Rep. of Germany . |
| 588781 | 6/1947 | United Kingdom ................ 285/328 |

Primary Examiner—Eric K. Nicholson
Attorney, Agent, or Firm—William W. Haefliger

[57] ABSTRACT

A coupling is provided for interconnecting two tubular parts having opposed ends and shoulders spaced from the ends, and via which force is applicable to urge the opposed ends toward one another. The coupling includes two tubular members defining a longitudinal axis and adapted to coaxially receive the respective parts and to transmit axial force thereto, via the shoulders; a torque isolator assembly including an annulus received against one of the shoulders on one of the members, and generally longitudinal projection means positioned on the one member to block rotation of the annulus relative to the one member, and about the axis; cooperating screw threads on the members adapted to interfit when the members are relatively rotated to make up the coupling; and a pusher surface on the other of the members engagable with the annulus to transmit axial force via the annulus to the one shoulder, when the coupling is made up.

11 Claims, 2 Drawing Sheets

TORSION ISOLATION FITTING

BACKGROUND OF THE INVENTION

This invention relates generally to fittings or couplings, and more particularly to improvements in tube fitting union nuts and nut assemblies.

When tightening tube fitting or coupling union nuts, severe twisting stresses are imparted to the tubes. When exposed to any transient vibrations, these fittings will have a tendency to loosen. One method to eliminate this stress is to reduce the friction of the threads by means of silver plating. Also accurate initial alignment of the tubes is required to allow the nut threads to be started, and to prevent any distortion of interengaging tube parts when the union is tightened. Current tube fitting union nuts do not adequately assure such tube alignment, and the tubes can loosen when vibrated.

There is need for an improved fitting or coupling assembly that will eliminate or substantially reduce twisting forces imparted to tube parts during coupling or fitting make-up, without reducing the ultimate tightening force of the union; also, there is need for improvements in such fittings that will assure adequate axial alignment of the tubular parts to be interconnected. There is particular need in this regard, as respects tubular parts having end flanges, with opposed annular protrusions that engage opposite faces of a sealing washer, as will appear.

SUMMARY OF THE INVENTION

It is a major object of the invention to provide a fitting or coupling assembly that will meet the above needs. As will appear, the provided coupling is characterized as interconnecting two tubular parts having opposed ends, and shoulders spaced from those ends and via which force or forces are applicable to urge the opposed ends toward one another. The coupling basically comprises:

a) two tubular members defining a longitudinal axis and adapted to coaxially receive the respective tubular parts and to transmit axial force thereto, via said shoulders, b) a torque isolator assembly including an annulus received against one of said shoulders on one of said members, and generally longitudinal projection means positioned on said one member to block rotation of the annulus relative to the one member, and about said axis, c) cooperating screw thread means on the two members adapted to interfit when said members are relatively rotated to make up the coupling, d) and a pusher surface on the other of said members engagable with the annulus to transmit axial force via said annulus to said one shoulder, when the coupling is made up.

The annulus typically has peripheral flat means engaged by said projection means to affect the blocking of annulus rotation. Also, the projection means typically extends longitudinally beyond one end of said one member, directionally toward the pusher surface on the other member, and is typically located radially outwardly of said pusher surface.

It is another object to provide the flat means on the annulus to be presented radially outwardly, and said projection means has a cooperating flat means facing radially inwardly for engagement with the flat means on the annulus. Such flat means on the annulus characteristically may include at least two flats, and cooperating flat means on the projection means includes at least two cooperating flats respectively engagable with the flats on the annulus. The annulus may comprise a flat plate having a rim, and two diametrically opposed flats at that rim. The projection means may then comprise two cooperating flats facing radially inwardly to engage the respective flats on the annulus.

Yet another object is to provide the torsion isolating annulus in the form of a plate which is effectively rotatably locked to said one member by interfit with said projection means, whereby the plate may be displaced only axially toward said one shoulder during make-up of the coupling. The other shoulder on a second of said tubular parts is then engaged by said one tubular part.

The invention is particularly well adapted to interconnect two tubular members having end flanges, with opposed convex annular protrusions that engage opposite sides of a metallic seal, as will be seen.

These and other objects and advantages of the invention, as well as the details of an illustrative embodiment, will be more fully understood from the following specification and drawings, in which:

DRAWING DESCRIPTION

DETAILED DESCRIPTION

Figure 1:
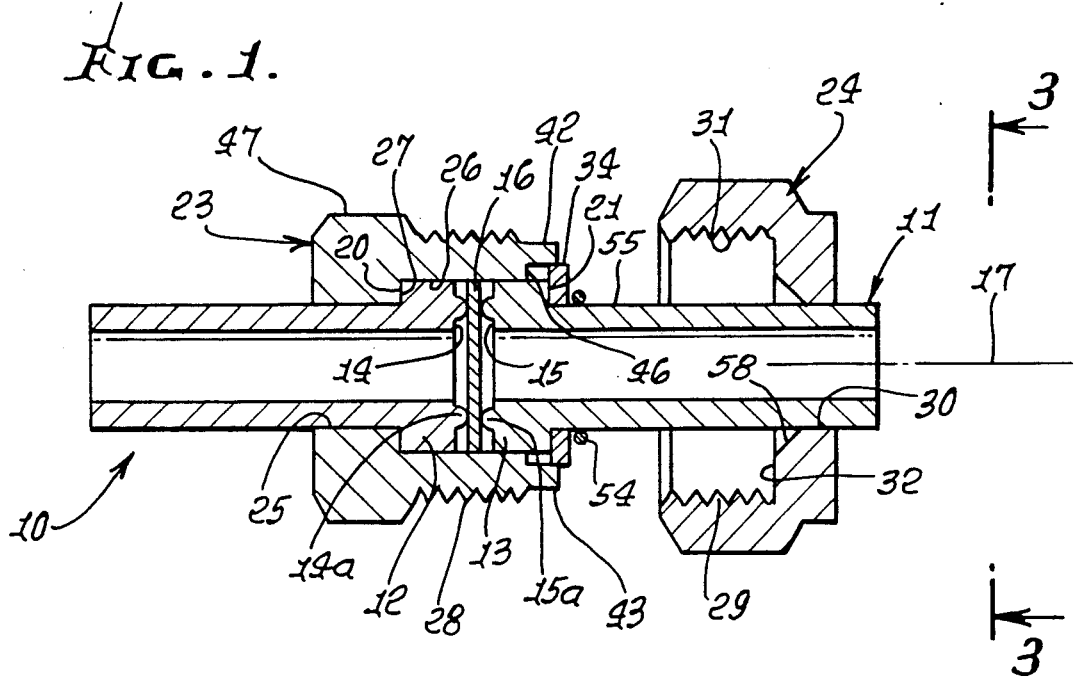
FIG. 1 is a section taken in elevation through the coupling elements during make-up.
Figure 2:
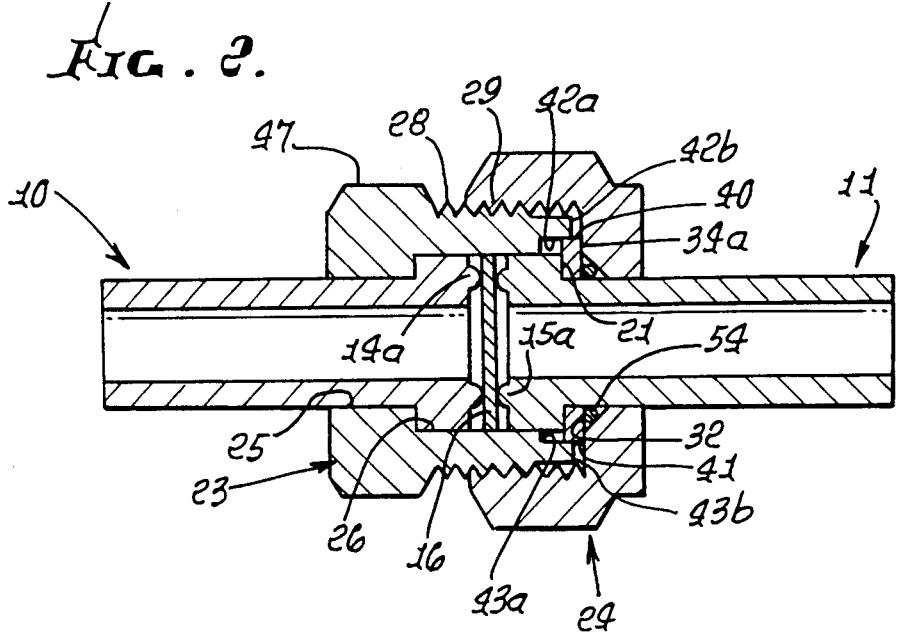
FIG. 2 is a section like FIG. 1, showing the coupling in made-up condition.
Figure 3:
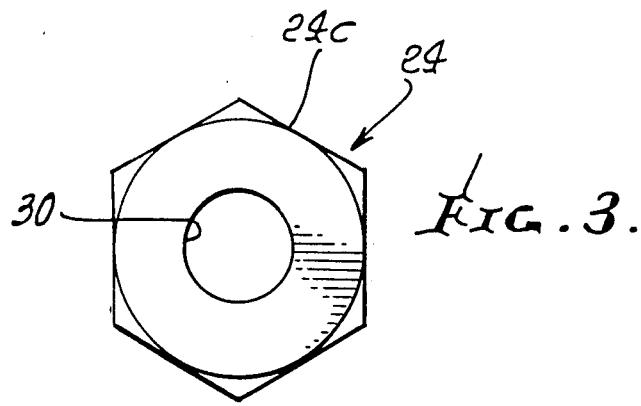
FIG. 3 is an end view of a female coupling taken on member lines 3—3 of FIG. 1.

In FIGS. 1 and 2, two tubular parts 10 and 11 extend coaxially, and have opposed ends. Flanges 12 and 13 on those parts define such ends at 14 and 15, and the flanges include annular protrusions 14a and 15a (each half toroidal) that present convex surfaces engagable with opposite flat sides of a metallic annular seal or compression washer 16. It is an object of the invention to provide coupling structure to urge the ends 14 and 15 toward one another so that protrusions 14a and 15a may tightly engage and seal against the annular seal, without rotary twisting movement about axis 17.

For this purpose, the tubular parts are provided with shoulders 20 and 21 facing axially oppositely away from the seal. Force is applicable against those shoulders to urge the parts 10 and 11 toward one another, without relative twisting. To this end, two tubular members are provided to define or extend coaxially with axis 17. See in this regard male member 23, and female member 24, adapted to coaxially receive the respective tubular parts, and to transmit axial force thereto, via the shoulders 20 and 21, when the members are made-up. In this regard, member 23 has a bore 25 to receive part 10, a counterbore 26 to receive flange 12, and a step shoulder 27 engagable with shoulder 20 on part 10, to urge that part rightwardly. Member 23 also has an external screw thread at 28, for threaded interengagement with interior "box" thread at 29 on female member 24, as is clear from FIG. 2. Member 24 has a bore 30 closely receiving the outer surface of part 11, a thread tip defined "bore"

31 to receive the forwardmost structure 42 and 43 of the member 23, and a shoulder 32 facing axially leftwardly to act as a pusher surface.

Figure 4:
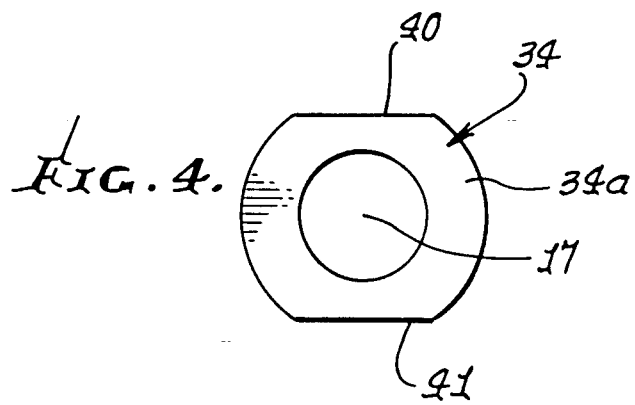
FIG. 4 is an end view of a torsion isolator, as employed in FIGS. 1 and 2.
Figure 5:
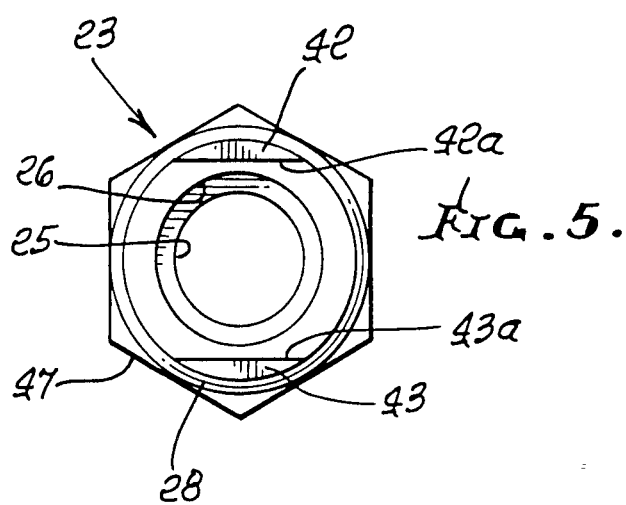
FIG. 5 is an end view of a male coupling member, as employed in FIGS. 1 and 2.
Figure 6:
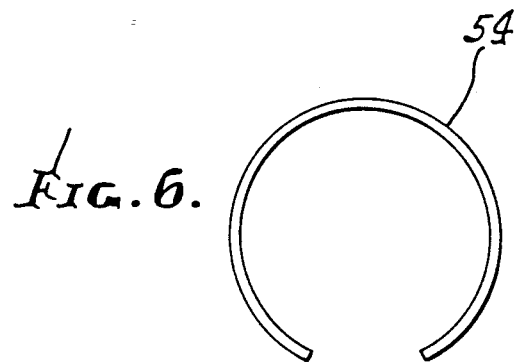
FIG. 6 is an axial view of a lock element as employed in FIGS. 1 and 2.

In accordance with the invention, a torque isolator annulus is provided at 34, and received against shoulder 21 on tubular part 11. Also, generally longitudinal projection means is positioned or carried on the one member 23 to block rotation of the isolator annulus relative to that member 23, and about axis 17. As seen in FIG. 4, the annulus 34 has peripheral flat means engaged by the projection means to effect the blocking of rotation of the annulus relative to member 23. As shown, two parallel flats 40 and 41 are provided at the rim of the annulus, at opposite sides of the axis 17; and the projection means preferably comprises two longitudinal projections 42 and 43 integral with 23, and spaced outwardly relative to counterbore 26 inasmuch as the flats 40 and 41 are also spaced outwardly of the counterbore 26 that also closely receives the two flanges 12 and 13. The projections 42 and 43 have flats 42a and 43a located close to, i.e. overlapping, the flats 40 and 41, respectively, to be engagable therewith and block rotation of the annulus, as seen in FIG. 2. That annulus has plate shape, as seen in the drawings. Flats 42a and 43a face radially inwardly. The end of the member 23 from which the projections 42 and 43 extend is indicated at 46.

Upon make-up of the coupling, the nut member 24 is rotatably threaded onto member 23, while the latter is held against rotation, as by a wrench gripping external flats 47 on 23. Flats 24c on 24 may also be gripped by a wrench. Such rotation of member 24 brings step shoulder 32 (i.e. pusher surface) into forcible engagement with the right face 34a of the torsion isolating annulus 34, as seen in FIG. 2. Make-up force is thus transmitted via 34 and shoulder 21 to part 11, for effecting squeezing of the compression washer 16. Annulus 34 acts to isolate the frictional torsion exerted by the rotating step shoulder 32, and prevent torque transmission to the surface 21, since the projections 42 and 43 block rotation of the annulus 34, by virtue of the interengagable flats on the projection and isolator annulus. Accordingly, parts 20, 21, member 23, and annulus 34 all may be considered as non-rotating, relative to member 24 as the latter is rotatably tightened onto member 23.

Very simple bore and counterbore structures may thus be provided on members 23 and 24, reducing fabrication cost to a minimum.

A C-shaped interior clip or ring (spring ring) 54 is also preferably provided to grip part 11 at the outer surface 55 of that part as shown, for positioning the annulus 34 on the part 11, adjacent flange 13. The nut member 24 has an annular recess 58 intersecting bore 30 and step shoulder 32, to receive the spring ring upon make-up. The clip or ring 54 also initially prevents rotation of the annulus or part 34 to keep the flats on the annulus axially aligned with the flats on the projections 42 and 43, during make-up.

Note that the terminal ends 42b and 43b of the projections 42 and 43 remain spaced from the step shoulder 32 during make-up. Accordingly, the annulus 34 is sufficiently thick to serve a spacing function, keeping the ends 42b and 43b spaced from 32.

The elements may consist of the following materials:
10 316 Stainless Steel
11 316 Stainless Steel
23 316 Stainless Steel
24 316 Stainless Steel
16 Nickel
34 316 Stainless Steel
54 316 Stainless Steel

I claim:

1. A coupling for interconnecting two tubular parts having opposed ends and shoulders spaced from said ends via which force is applicable to urge said opposed ends toward one another, comprising
    a) two tubular members defining a longitudinal axis and adapted to coaxially receive the respective parts and to transmit axial force thereto, via said shoulders,
    b) a torque isolator assembly including a metallic annulus received against one of said shoulders on one of said parts, and generally longitudinal projection means positioned on said one member to block rotation of said annulus relative to said one member, and about said axis,
    c) cooperating screw thread means on said members adapted to interfit when said members are relatively rotated to make up the coupling, the one member received into the other of said members,
    d) and a pusher surface on the other of said members engagable with said annulus to transmit axial force via said annulus to said one shoulder, when the coupling is made up,
    e) and wherein said tubular parts have end flanges with annular protrusions that present convex surfaces, with a metallic annular seal between and engaged by said surfaces in response to coupling make-up,
    f) said one member having a counterbore closely receiving the periphery of said flanges and said metallic seal and terminating in spaced relation to said metallic annulus,
said metallic seal axially spaced from both said shoulders.

2. The coupling of claim 1 wherein said annulus has peripheral flat means engaged by said projection means to affect the blocking of said rotation of said annulus.

3. The coupling of claim 1 wherein said projection means extends longitudinally beyond one end of said one member, directionally toward said pusher surface of the other member.

4. The coupling of claim 3 wherein said projection means is located radially outwardly of said pusher surface.

5. The coupling of claim 4 wherein said projection means extends along the longitudinal axis beyond the thread means on said one member.

6. The coupling of claim 2 wherein said flat means extends radially outwardly, and said projection means has cooperating flat means facing radially inwardly for engagement with the flat means on the annulus.

7. The coupling of claim 6 wherein said flat means on the annulus includes at least two flats, and said cooperating flat means on the projection means includes at least two cooperating flats respectively engageable with the flats on the annulus.

8. The coupling of claim 7 wherein the annulus comprises a flat plate having a rim, and two diametrically opposed flats at said rim.

9. The coupling of claim 1, wherein said annulus comprises a plate which is effectively rotatably locked to said one member by interfit with said projection means whereby the plate may be displaced only axially toward said one shoulder during make-up of the coupling, the other shoulder on a second of said tubular parts then being engaged by said one tubular member.

10. The coupling of claim 8 wherein the projection means comprises two projections extending generally parallel to said axis, at opposite sides of that axis, the annulus plate having sufficient thickness to maintain the terminal ends of said projections spaced from a plane defined by the pusher surface.

11. The coupling of claim 10 including a lock ring on one of said parts, for positioning the annulus adjacent said one shoulder, and for resisting rotation of the annulus relative to said one member and relative to said parts, during make-up of the coupling.

* * * * *